3,125,603
PROCESS FOR THE PRODUCTION OF N-TRIALKYLBORAZANES

Roland Köster, Mulheim-Ruhr, Germany, assignor to Studiengesellschaft Kohle m.b.H., Mulheim-Ruhr, Germany
No Drawing. Filed Feb. 3, 1958, Ser. No. 712,666
Claims priority, application Germany Feb. 5, 1957
14 Claims. (Cl. 260—583)

This invention relates to a process for the production of N-trialkyl borazanes.

N-trialkyl borazanes of the general formula $H_3B.NR_3$ (R=hydrocarbon radicals, which are the same or different from one another) are obtained by the process of Belgian patent specification No. 558,170 by hydrogenation of boron hydrocarbons, preferably boron trialkyls, in the presence of tertiary amines. It is true that this process proceeds smoothly, but it requires the initial production of boron hydrocarbons. During the hydrogenation, which must take place under pressure, the hydrocarbon radicals are lost in the form of hydrocarbons which are split off.

The present invention provides a process in which the use of boron hydrocarbons is avoided and boron halides, such as boron trifluoride or boron trichloride, are used instead as original starting materials. These boron halides can be converted in known manner, by reaction with tertiary amines substituted by hydrocarbons, preferably with trialkylamines, into compounds of the general formula $R_3N.BF_3$, in which R represents any desired hydrocarbon radical, but is preferably an alkyl radical.

In accordance with the invention, N-trialkyl borazanes are produced from trialkylamine compounds of the boron halides (i.e. from N-trialkyl halogenoborazanes) by reacting these compounds with metal hydrides of the first and second groups of the periodic system in accordance with Equations 1 and 2 respectively:

$$R_3N.BF_3 + 3Me_IH = R_3N.BH_3 + 3Me_IF \quad (1)$$
$$2R_3N.BF_3 + 3Me_{II}H_2 = 2R_3N.BH_3 + 3Me_{II}F_2 \quad (2)$$

It is surprising that the boron halides, in the form of their stable addition compounds with tertiary amines, readily permit the reaction referred to above. Among the trialkyl halogenoborazanes, the N-triethyl fluoroborazane has for example been described (Gmelins Handbuch der Anorganischen Chemie, VIIIth edition, boron supplementary volume, page 250, and J. Am. Chem. Soc., volume 51, pages 2,693 to 2,695); it is described as being a substance which decomposes very readily, turns brown in colour after standing for a short time at room temperature and in particular does not withstand heat.

The reaction in accordance with the invention takes place even at room temperature, but is assisted by raising the temperature to 100° C. or higher. It was not to be expected that it would be possible to work with these sensitive substances at all, and certainly not at elevated temperatures.

We attribute this possibility to the surprising fact that the trialkyl halogenoborazanes can be stabilised by non-halogenated trialkyl borazanes. This will be seen from the following comparative experiments.

(A) If dry triethylamine is added dropwise to boron fluoride etherate at room temperature, the mixture becomes heated and ether distils off. At the same time, the liquid becomes brown. It is obvious that far-reaching decomposition reactions take place.

(B) If the same experiment is repeated with the addition of 1–2% of triethyl borazane to the triethylamine, the mixture remains completely colourless. After removal of the ether, the trifluorotriethyl borazane solidifies as completely colourless crystals. This compound can easily be distilled in vacuo (boiling point 118° C. at 9 mm.). This would scarcely be possible with the unstabilised substance.

It is thus very important for the good progress of the process of the invention that there is a moment at which there is a very strongly stabilizing moment in the formation and in the continuous presence of the reaction product itself. Even the formation of the N-trialkyl borazanes, which is immediately initiated, is frequently sufficient. For reasons of safety, however, it is desirable to add small proportions of the halogen-free N-trialkyl borazanes initially to the N-trialkyl halogenoborazanes.

The metal hydrides are preferably used in finely divided form. Instead of the metal hydrides, the complex compounds thereof with boron hydrides or boric acid esters can be used, for example calcium borohydride of the formula $Ca(BH_4)_2$ or the complex compounds between lithium hydride and trimethyl boric acid esters of the formula $Li(B(OCH_3)_3H)$. Generally speaking, the complex metal hydrides react with the boron halides even more easily than do the simple metal hydrides.

It is desirable to work in the presence of a solvent, for example a hydrocarbon or an ether. It is particularly advantageous to utilize as solvent the N-trialkyl borazane which is being produced, this simultaneously having a stabilizing action. It is advisable to use a ball mill as the reaction vessel. In this case, a fresh surface of the metal hydrides is continually exposed and the surface is freed from any crust of the metal halide which may form.

When trialkyl compounds of boron chloride are used as an initial component, a very wide range of different metal hydrides of the first or second groups of the periodic system can be used; when trialkylamine compounds of boron fluoride are used, the reaction proceeds without the slightest difficulty with lithium hydride or hydrides of the metals of the second group of the periodic system. Most advantageous from an economic point of view is the reaction of calcium hydride with N-trialkyl fluoroborazanes or boron fluoride in the presence of tertiary amines in accordance with Equation 2.

By working with calcium borohydride instead of calcium hydride, the reaction takes place in accordance with Equation 3:

$$3Ca(BH_4)_2 + 6NR_3 + 2F_3B.NR_3 = 8H_3B.NR_3 + 3CaF_2$$

In this connection, as will be seen from the equation, it is desirable to work in the presence of excess amines. If three-quarters of the resulting borazane is heated with calcium hydride, then the two first starting substances of Equation 3 are obtained in accordance with Equartion 4:

$$6H_3B.NR_3 + 3CaH_2 = 3Ca(BH_4)_2 + 6NR_3$$

It is then only necessary to add N-trialkyl fluoroborazanes in order to repeat the reaction in accordance with Equation 3. Therefore, if a quantity of an N-trialkyl borazane is available, it is possible to obtain therefrom any desired further quantities of the N-trialkyl borazane by alternate introduction of calcium hydride and boron fluoride aminate.

It is advantageous for the procedure in this case to be such that an N-trialkyl borazane is used as solvent and mixed with the boron fluoride-trialkylamine compound. If calcium hydride is constantly added in finely powdered form, preferably as a suspension in an inert solvent, such as in hydrocarbons or ether, or in trialkyl borazanes, the reaction takes place particularly quickly and smoothly, probably because calcium borohydride is formed as an intermediate. If a boron fluoride-trialkylamine is also run in at the same time, the process can be carried out in a fully continuous manner.

The reaction of N-trialkyl fluoroborazanes with metal hydrides, such as sodium or potassium hydride, or with the corresponding metal borohydrides $MBH_4$ ($M=Na$ or $K$), cannot be carried out as smoothly, because the metal fluorides formed in accordance with Equations 1 and 3 form stable complex salts $MBF_4$ with the boron fluoride in accordance with the following Equations 5 and 6, which salts can only be split off with difficulty.

$$3NaH + 4F_3B.NR_3 = H_3B.NR_3 + 3NaBF_4 + 3NR_3 \quad (5)$$
$$3KBH_4 + 4F_3B.NR_3 = 4H_3B.NR_3 + 3KBF_4 \quad (6)$$

It is then necessary to use more boron fluoride-trialkylamine than is required by Equation 1. However, the sodium borofluoride can for example be decomposed by heating to boron fluoride and sodium fluoride and the resulting boron fluoride combined with trialkylamine to form trialkylamine fluoroborazanes, which can be used again.

It has been found that the reactions in accordance with the process of the invention proceed particularly easily and quantitatively, so that there is a pronounced advantage as compared with former processes of this nature (for example when boron fluoride-etherates are used). The different embodiments of the process of the invention permit the N-trialkyl borazane which is formed to be separated in the simplest possible manner from the solid phase, either by distillation, preferably in vacuo, or by an extraction treatment.

The following examples further illustrate the invention.

*Example 1*

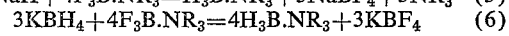

59 G. (2.68 mols) of lithium borohydride are mixed with 271 g. (2.68 mols) of triethylamine under nitrogen and with exclusion of moisture (the lithium borohydride partially dissolves in the amine), and there are added dropwise and fairly quickly a total of 151 g. (0.895 mol.) of boron fluoride triethylaminate while stirring well and at a temperature of 100–110° C., the reaction starting immediately with violent boiling. After all the boron trifluoride triethylaminate has been added, the mixture is heated to about 140° C. Very soon no more refluxing can be observed. The mixture is heated for another hour (at 130–140° C.) and the N-triethyl borazane is thereafter distilled off in water jet vacuum as a colourless liquid with a boiling point B.P.$_{7/8}$=88.89° C. In this way, 405 g. (98–99% of the theoretical) of N-triethyl borazane are obtained the hydrogen content of which, on decomposition of a sample with dilute acid, is theoretical. About 70 g. of dry colourless lithium fluoride in powder form are left as residue.

*Example 2*

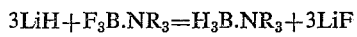

24 g. (1 mol) of lithium hydride in 400 cc. of perhydrocumene are placed in a heatable 1-litre vibrating ball mill (provided with a reflux condenser) and reacted at 140–160° C. for 2–3 hours under slight reflux with 59 g. (0.33 mol.) of dimethyl cyclohexyl aminoborofluoride (stabilised with a few drops of any desired borazane). The lithium fluoride which is formed is then filtered off.

After the solvent has been distilled off at reduced pressure (B.P.$_{10\ mm.}$=45° C.), 42 g. of N-dimethyl cyclohexyl borazane with a melting point of 49° C. are obtained, this representing 90% of the theoretical.

*Example 3*

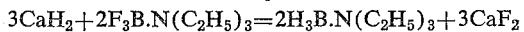

A suspension of 84 g. (2 mols) of very finely divided calcium hydride (obtained by grinding in the vibrating ball mill) in 360 cc. of perhydrocumene is heated to 140–150° C. while stirring thoroughly and with complete exclusion of moisture. 225 g. (1.33 mols) of boron fluoride-triethylaminate are gradually added dropwise over a period of about 30 minutes, and initially, because of the reaction which starts immediately, the amine liberated is refluxed. Heating is then continued for approximately another 4 hours. Initially the solvent and then the N-triethyl borazane which is formed are distilled off at reduced pressure. 130 g. of borazane with a B.P.$_{.9\ mm.}$=99–91° C.

are obtained, this representing 85% of the theoretical. Calcium fluoride is left as residue.

*Example 4*

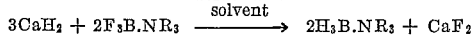

338 g. (2 mols) of N-triethyl fluoroborozane $F_3B.N(C_2H_5)_3$ are dissolved in 500 cc. (368 g.) of N-triethyl borazane in a 2-litre 3-necked flask fitted with a dropping device, stirrer and thermometer. The liquid is heated to 140° C. and a suspension of 126 g. (3 mols) of finely ground calcium hydride in approximately 500 cc. of perhydrocumene is added dropwise over a period of about 1 hour while stirring well. Reaction immediately takes place. After the mixture has been heated for 2–3 hours, the solvent is distilled off at slightly reduced pressure. 338 g. (2 mols) of boron fluoride-triethylaminate are then added to the mixture in the 2-litre flask, and then another 126 g. (3 mols) of the calcium hydride suspension in perhydrocumene are added dropwise at 140–150° C. over a period of 1 hour. After a reaction time of 3 hours, all the liquid is separated by filtration through a glass suction filter from the resultant calcium fluoride, with final washing with a hydrocarbon. After the solvent has been distilled off at reduced pressure (perhydrocumene: B.P.$_{.8-10\ mm.}$=40–45° C.) about 90% of the theoretical of N-triethylborazane (B.P.$_{.9\ mm.}$=90–91° C.) are obtained from the filtrate as well as the borazane (386 g.) originally used as solvent.

*Example 5*

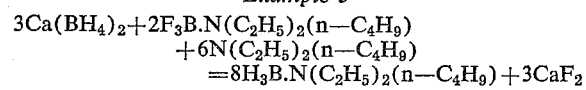

A mixture of 70 g. (1 mol) of finely powdered calcium borohydride, 300 g. (2.32 mols) of diethyl-n-butylamine and 130 g. (0.655 mol) of boron fluoride-diethyl-n-butylaminate is heated while stirring well and with exclusion of moisture until it boils gently (at the boiling point of the excess amine). After 2 hours, the mixture is cooled and the liquid is filtered off from the solid compound ($CaF_2$). As filtrate, there is obtained a clear solution, from which, by distillation at reduced pressure and after first runnings consisting of excess trialkylamine, there are obtained a total of 370 g. of N-diethyl-n-butylborazane with a B.P.$_{.14\ mm.}$=125° C. this representing 97–98% of the theoretical.

*Example 6*

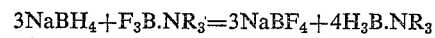

In a 1-litre 3-necked flask (fitted with a reflux condenser and thermometer connections), 114 g. (3 mols) of sodium borohydride are reacted with 670 g. of boron fluoride-triethylaminate for 3–4 hours at 150–160° C. while stirring well. After cooling, 414 g. (90% of the theoretical)

of N-triethyl borazane (B.P.$_{.9\ mm.}$=90–91° C.) are obtained by distillation at reduced pressure.

Example 7

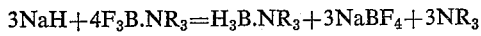
$$3NaH + 4F_3B.NR_3 = H_3B.NR_3 + 3NaBF_4 + 3NR_3$$

338 g. (2 mols) of N-triethyl fluoroborazane are heated to 140–150° C. in a 1-litre vibrating ball mill (fitted with a metal bellows with a reflux condenser). 300 g. of xylene, in which are suspended 36 g. (1.5 mols) of sodium hydride, are gradually run in over a period of about 1 hour. The amine liberated is distilled off with some solvent and a suspension of sodium borofluoride in N-triethylborazane and excess xylene is obtained after 3 to 4 hours. After cooling, the solid compound is filtered off and washed with a hydrocarbon. By distillation at reduced pressure and after removal of the solvent, a total of 50 g. (88% of the theoretical) of N-triethyl borazane are obtained (B.P.$_{.9\ mm.}$=90–91° C.).

Example 8

$$3NaBH_4 + 3NR_3 + Cl_3B.NR_3 = 4H_3B.NR_3 + NaCl$$

A mixture of 109 g. (0.5 mol) of β-trichloro-N-triethyl borazane (stabilized during its production from boron trichloride and ethylamine with 2–3 cc. of N-triethyl borazane, so that the compound is only slightly yellowish in colour), 57 g. of sodium borohydride (1.5 mols) and 161 g. (1.6 mols) of triethylamine is diluted with 500 cc. of xylene and slowly heated under a reflux condenser to 120–140° C. while stirring well. A relatively strong reflux (of the amine) is observed when the heating is begun, this reflux almost completely disappearing over a period of about 2–3 hours. The mixture, which initially is pale yellow in colour, becomes completely colourless with the formation of the N-triethyl borazane. The internal temperature rises on completion of the reaction and finally reaches the boiling point of the pure solvent. The solvent is thereafter distilled off with some excess amine (about 10 g.) and a total of 225 g. (=98% of the theoretical) of N-triethyl borazane (B.P.$_{.9\ mm.}$=89–90° C.) are obtained by distillation at reduced pressure. The dry colourless residue consists of pure sodium chloride (about 87 g.).

Example 9

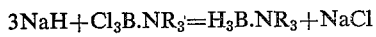
$$3NaH + Cl_3B.NR_3 = H_3B.NR_3 + NaCl$$

A suspension of 72 g. (3 mols) of finely divided sodium hydride in 500 cc. of perhydrocumene is added dropwise with complete exclusion of moisture and over a period of about 2 hours to a mixture of 218 g. (1 mol) of β-chloro-N-triethyl-borazane and 400 cc. of N-triethyl borazane, the mixture being well stirred and heated to 140° C. The mixture is thereafter heated for another 2 hours at 140–150° C., then allowed to cool and the liquid is filtered off from the sodium chloride which has separated out. After the solvent has been distilled off, a total 533 cc. of N-triethyl borazane is obtained from the clear filtrate. This corresponds to 103 g. of newly obtained borazane (yield=90% of the theoretical); B.P.$_{.9\ mm.}$=89–90° C.

What I claim is:

1. Process for the production of N-trialkylborazanes, which comprises reacting in the presence of small proportions of halogen-free N-trialkylborazanes a compound of the general formula R$_3$N.B(Hal)$_3$, wherein each R represents a member selected from the group consisting of alkyl and cycloalkyl groups having up to 6 carbon atoms, the total number of carbon atoms in said R$_3$N moiety not to exceed 12, Hal designating a member selected from the group consisting of fluorine and chlorine, with a compound which is selected from the group consisting of alkali metal hydrides (MH), alkaline earth metal hydrides (MH$_2$), alkali metal borohydrides (MBH$_4$), alkaline earth metal borohydrides (M[BH$_4$]$_2$), complex compounds of alkali metal hydrides (MH) with trimethyl boric acid esters and complex compounds of alkaline earth metal hydrides (MH$_2$) with trimethyl boric acid esters, employing a molar ratio of said metal compound to R$_3$N.B(Hal)$_3$ of 3:1 when the metal component of said metal compound is monovalent, and of 3:2 when said metal component is divalent and recovering said N-trialkylborazane formed.

2. Process according to claim 1 wherein said hydride group member is in a finely divided form.

3. Process according to claim 1 wherein said N-trialkyl borazane is the N-trialkyl borazane to be produced in the reaction.

4. Process according to claim 1 wherein said reaction is carried out in the presence of an inert solvent.

5. Process according to claim 1 in which the reaction is effected in the presence of an N-trialkyl borazane as a solvent.

6. Process according to claim 5 wherein the solvent is the N-trialkyl borazane to be produced.

7. Process according to claim 1 wherein said trialkylamine compound (R$_3$N.B(Hal)$_3$ wherein each R represents a member selected from the group consisting of alkyl and cycloalkyl groups having up to 6 carbon atoms, the total number of carbon atoms in said R$_3$N moiety not to exceed 12, Hal designating a member selected from the group consisting of fluorine and chlorine) is a trialkylamine compound of boron trichloride.

8. Process according to claim 1 wherein said trialkylamine compound (R$_3$N.B(Hal)$_3$, wherein each R represents a member selected from the group consisting of alkyl and cycloalkyl groups having up to 6 carbon atoms, the total number of carbon atoms in said R$_3$N moiety not to exceed 12, Hal designating a member selected from the group consisting of fluorine and chlorine) is a trialkylamine compound of boron trifluoride.

9. Process according to claim 8 wherein said trialkylamine compound of boron trifluoride is reacted with calcium hydride.

10. Process for the continuous production of an N-trialkylborazane, which comprises reacting a compound of the general formula R$_3$N.B(Hal)$_3$, wherein each R represents a member selected from the group of alkyl and cycloalkyl groups having up to 6 carbon atoms the total number of carbon atoms in said R$_3$N moiety not to exceed 12, Hal designating a member selected from the group consisting of fluorine and chlorine, with sodium hydride in a molar ratio of R$_3$N.B(Hal)$_3$:NaH of 1:3, recovering the borazane formed, decomposing by heating the sodium borofluoride formed at the same time into boron trifluoride and sodium fluoride, reacting said boron trifluoride with a trialkylamine of the formula NR$_3$, wherein R is as defined above, the form a trialkylamine compound of boron trifluoride and reacting said trialkylamine compound of boron trifluoride with sodium hydride, and recovering the borazane formed.

11. Process for the continuous production of an N-trialkylborazane, which comprises reacting a trialkylamine compound of boron trifluoride having the general formula R$_3$N.BF$_3$, wherein each R represents a member selected from the group of alkyl and cycloalkyl groups having up to 6 carbon atoms, the total number of carbon atoms in said R$_3$N moiety not to exceed 12, with a member selected from the group consisting of alkali metal borohydrides (MBH$_4$) and alkaline earth metal borohydrides (M(BH$_4$)$_2$) employing a molar ratio of said metal compound to R$_3$N.B(Hal)$_3$ of 3:1 when the metal component of said metal compound is monovalent and of 3:2 when said metal component is divalent in the presence of trialkylamine, recovering a portion of the N-trialkylborazane formed and thereafter reacting the remaining N-trialkylborazane with calcium hydride, reacting the calcium borohydride and trialkylamine formed with a N-trialkyl fluoroborazane, and recovering the N-trialkylborazane formed.

12. Process according to claim 11 wherein said alkaline earth metal borohydride is calcium borohydride.

13. Process according to claim 11 wherein there is employed as solvent for said trialkylamine compound of boron trifluoride a N-trialkyl borazane and said calcium hydride is added in finely powdered form to the reaction.

14. Process according to claim 13 wherein said calcium hydride is added in the form of a suspension in an inert solvent.

References Cited in the file of this patent

UNITED STATES PATENTS

| | | |
|---|---|---|
| 2,257,194 | Rosen | Sept. 30, 1941 |
| 2,880,058 | Bronaugh | Mar. 31, 1959 |
| 2,945,887 | Jenkner | July 19, 1960 |

OTHER REFERENCES

Mellor: Treatise on Inorganic and Theoretical Chemistry, vol. 5, p. 126 (1924).

Burg et al.: J.A.C.S., vol. 62, pp. 3425–3529 (1940).

Coats: Journal of the Chemical Society, 1950, Part IV, pages 3481–83.

Schlesinger et al.: J.A.C.S., vol. 75, pp. 186–190, 195–204 (1953).

Patterson: Chemical and Engineering News, vol. 34, page 560 (1956).

Schechter et al.: "Boron Hydrides and Related Compounds" (prepared under Navy Contract NOa(s) 10992), pp. 20–21 (1951, declassified 1953).

UNITED STATES PATENT OFFICE
CERTIFICATE OF CORRECTION

Patent No. 3,125,603 March 17, 1964

Roland Köster

It is hereby certified that error appears in the above numbered patent requiring correction and that the said Letters Patent should read as corrected below.

Column 3, lines 51 and 73, for "mol.", each occurrence, read -- mol --; column 4, line 20, for "99-91° C." read -- 90-91° C. --; lines 28 and 29, for "ni-triethyl" read -- N-triethyl --.

Signed and sealed this 14th day of July 1964.

(SEAL)

Attest:

ESTON G. JOHNSON
Attesting Officer

EDWARD J. BRENNER
Commissioner of Patents